United States Patent
Xu et al.

(10) Patent No.: US 12,108,469 B2
(45) Date of Patent: Oct. 1, 2024

(54) DATA FORWARDING PROCEDURES FOR RELAY WIRELESS DEVICES

(71) Applicant: Apple Inc., Cupertino, CA (US)

(72) Inventors: Fangli Xu, Beijing (CN); Dawei Zhang, Saratoga, CA (US); Haijing Hu, Beijing (CN); Yuqin Chen, Shenzhen (CN); Longda Xing, San Jose, CA (US); Srinivasan Nimmala, San Jose, CA (US); Srirang A. Lovlekar, Cupertino, CA (US); Sethuraman Gurumoorthy, San Jose, CA (US); Murtaza A. Shikari, Mountain View, CA (US); Sree Ram Kodali, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 351 days.

(21) Appl. No.: 17/442,100

(22) PCT Filed: Jul. 24, 2020

(86) PCT No.: PCT/CN2020/104661
§ 371 (c)(1),
(2) Date: Sep. 22, 2021

(87) PCT Pub. No.: WO2022/016559
PCT Pub. Date: Jan. 27, 2022

(65) Prior Publication Data
US 2022/0304083 A1    Sep. 22, 2022

(51) Int. Cl.
*H04W 76/11*    (2018.01)
*H04W 88/04*    (2009.01)

(52) U.S. Cl.
CPC ............ *H04W 76/11* (2018.02); *H04W 88/04* (2013.01)

(58) Field of Classification Search
CPC ..... H04W 76/11; H04W 88/04; H04W 76/14; Y02D 30/70
See application file for complete search history.

(56) References Cited

U.S. PATENT DOCUMENTS

| | | | |
|---|---|---|---|
| 10,257,677 B2 | 4/2019 | Baghel et al. | |
| 10,484,517 B2 | 11/2019 | Cheng et al. | |

(Continued)

FOREIGN PATENT DOCUMENTS

| | | |
|---|---|---|
| CN | 108617024 A | 10/2018 |
| EP | 3579642 | 12/2019 |

(Continued)

OTHER PUBLICATIONS

English translation for JP-3843807-B2 (Araki T, Nov. 8, 2006) (Year: 2006).*

(Continued)

*Primary Examiner* — Marisol Figueroa
(74) *Attorney, Agent, or Firm* — Kowert, Hood, Munyon, Rankin & Goetzel, P.C.

(57) ABSTRACT

This disclosure relates to techniques for performing relay communication by a relay wireless device in a wireless communication system. A relay wireless device may receive bearer configuration information from a network. Based on the bearer configuration information, the UE may establish a bearer with a remote wireless device. The relay wireless device may forward data to/from the remote wireless device using the bearer.

19 Claims, 16 Drawing Sheets

(56) References Cited

U.S. PATENT DOCUMENTS

| | | | |
|---|---|---|---|
| 10,660,010 B2 | 5/2020 | Aminaka et al. | |
| 2009/0016290 A1 | 1/2009 | Chion | |
| 2018/0192457 A1 | 7/2018 | Yi | |
| 2018/0295534 A1* | 10/2018 | Huang | H04W 76/15 |
| 2019/0045574 A1 | 2/2019 | Feng | |
| 2019/0357280 A1* | 11/2019 | Lee | H04W 8/26 |
| 2019/0373538 A1 | 12/2019 | Tao | |
| 2020/0059980 A1 | 2/2020 | Hong et al. | |
| 2020/0351982 A1* | 11/2020 | Kim | H04W 12/03 |
| 2021/0212151 A1* | 7/2021 | Paladugu | H04W 76/28 |
| 2021/0385714 A1* | 12/2021 | Paladugu | H04W 36/30 |
| 2021/0400713 A1* | 12/2021 | He | H04W 72/21 |

FOREIGN PATENT DOCUMENTS

| | | | | |
|---|---|---|---|---|
| JP | 3843807 B2 * | 11/2006 | | |
| WO | WO-2017099837 A1 * | 6/2017 | | H04W 68/00 |
| WO | 2018144248 A1 | 8/2018 | | |

OTHER PUBLICATIONS

International Search Report for PCT Patent Application No. PCT/CN2020/104661; mailed Apr. 15, 2021.

Partial Supplementary European Search Report for EP Patent Application No. 20946477.5; Feb. 7, 2024.

\* cited by examiner

DATA FORWARDING PROCEDURES FOR RELAY WIRELESS DEVICES

PRIORITY CLAIM INFORMATION

This application is a U.S. National Stage application of International Application No. PCT/CN2020/104661, filed Jul. 24, 2020, titled "Data Forwarding Procedures for Relay Wireless Devices", which is hereby incorporated by reference in its entirety.

TECHNICAL FIELD

The present application relates to wireless communication, including to data forwarding procedures for relay wireless devices, remote wireless devices, base stations, and network elements in a wireless communication system.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. Therefore, improvements in the field are desired.

SUMMARY

Embodiments are presented herein of, inter alia, systems, apparatuses, and methods for performing radio resource control connection procedures for remote wireless devices in a wireless communication system.

As noted above, the number of use cases for different classes of wireless devices with widely variable capabilities and usage expectations are growing. One direction in expansion of possible use cases supported by wireless communication techniques may include increasing use and numbers of low cost and/or low power consumption wireless devices. Supporting the capability of such wireless devices to exchange data and obtain access to a cellular network by way of an intermediate relay wireless device may increase the utility of such low cost and/or low power consumption wireless devices.

Accordingly, the techniques described herein include techniques for forwarding data between a remote device and a cellular network via a relay device, forwarding data between a remote device and a relay device, and forwarding data between multiple remote devices and a relay device, among other techniques. A relay device and remote device may implement forwarding according to control information received from a network, among various possibilities.

The techniques described herein may be implemented in and/or used with a number of different types of devices, including but not limited to mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
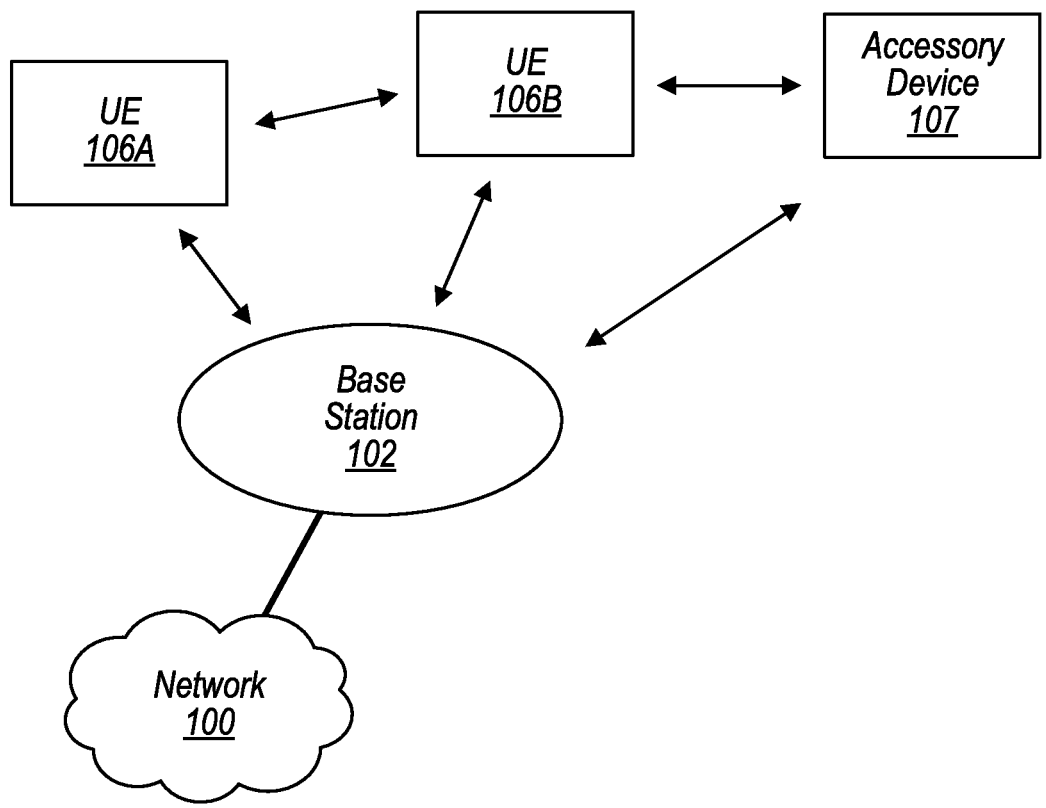
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.
3GPP: Third Generation Partnership Project
3GPP2: Third Generation Partnership Project 2
GSM: Global System for Mobile Communications
UMTS: Universal Mobile Telecommunications System
LTE: Long Term Evolution
IoT: Internet of Things
NB: Narrowband
D2D: device-to-device
OOC: out-of-coverage

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™ Android™-based phones), tablet computers (e.g., iPad™, Samsung Galaxy™), portable gaming devices (e.g., Nintendo DS™, Play Station Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well as any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
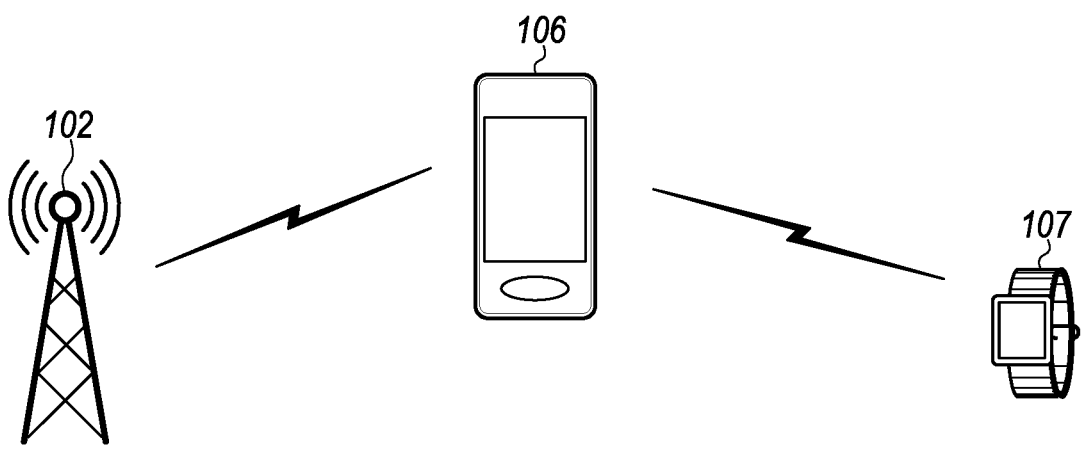
FIG. 2 illustrates an example wireless communication system in which two wireless devices can perform direct device-to-device communication, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware and/or software that enables wireless communication with the UE devices 106A, 106B, and 107. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi. In some instances, the UE 106B and the accessory device 107 may perform direct peer-to-peer communication using proximity services (ProSe) techniques, e.g., in a manner supported by a cellular base station. For example, such ProSe communication may be performed as part of a relay link to support a radio resource control connection between the accessory device 107 and the BS 102, such as according to various embodiments described herein.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, it may be the case that the UE 106A and UE 106B are capable of arranging and performing D2D communication (e.g., including discovery communications) with each other even when out-of-coverage of the BS 102 and other cellular base stations.

FIG. 2 illustrates an example BS 102 in communication with a UE device 106, which in turn is in communication with an accessory device 107. The UE device 106 and accessory device 107 may be any of a mobile phone, a tablet, or any other type of handheld device, a smart watch or other wearable device, a media player, a computer, a laptop, UAV, unmanned aerial controller, vehicle, or virtually any type of wireless device. In some embodiments, the accessory device may be a wireless device designed to have low cost and/or low power consumption, and which may benefit from use of a relay link with the UE device 106 (and/or another companion device) to support communication with the BS 102. A device that utilizes a relay link with another wireless device to communicate with a cellular base station, such as in the illustrated scenario of FIG. 2, may also be referred to herein as a remote wireless device, a remote device, or a remote UE device, while a wireless device that provides such a relay link may also be referred to herein as a relay wireless device, a relay device, or relay UE device. According to some embodiments, such a BS 102, UE 106, and accessory device 107 may be configured to perform radio resource control procedures for remote wireless devices in accordance with various of the techniques described herein.

The UE 106 and accessory device 107 may each include a device or integrated circuit for facilitating cellular communication, referred to as a cellular modem. The cellular modem may include one or more processors (processing elements) that is configured to execute program instructions stored in memory, and/or various hardware components as described herein. The UE 106 and/or accessory device 107 may each perform any of the method embodiments described herein by executing such stored instructions. Alternatively, or in addition, the UE 106 and/or accessory device 107 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or accessory device 107 may include one or more antennas for communicating using one or more wireless communication protocols according to one or more RAT standards. In some embodiments, one or both of the UE 106 or accessory device 107 might be configured to communicate using a single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

Alternatively, the UE 106 and/or accessory device 107 may include two or more radios. For example, in some embodiments, the UE 106 and/or accessory device 107 may include separate transmit and/or receive chains (e.g., including separate antennas and other radio components) for each wireless communication protocol with which it is configured to communicate. As a further possibility, the UE 106 and/or accessory device 107 may include one or more radios that are shared between multiple wireless communication protocols, and one or more radios that are used exclusively by a single wireless communication protocol. For example, the UE 106 and/or accessory device 107 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
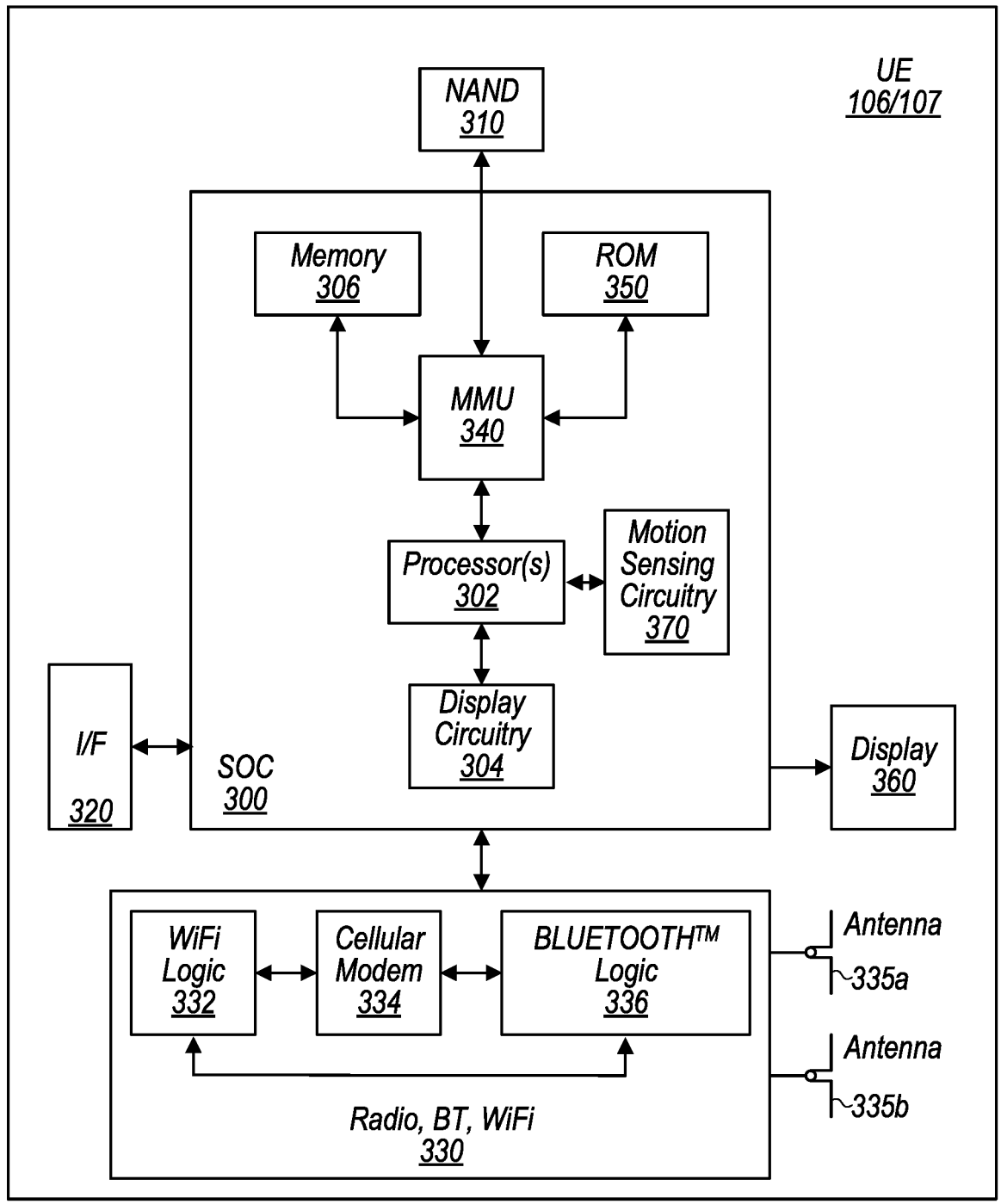
FIG. 3 is a block diagram illustrating an example wireless device, according to some embodiments.

FIG. 3—Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310), and/or to other circuits or devices, such as the display circuitry 304, radio 330, I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using multiple wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. The processor(s) 302 of the UE device 106/107 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform radio resource control procedures for remote wireless devices according to various embodiments disclosed herein. Processor(s) 302 may also implement various other applications and/or end-user applications running on UE 106. Alternatively or additionally, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
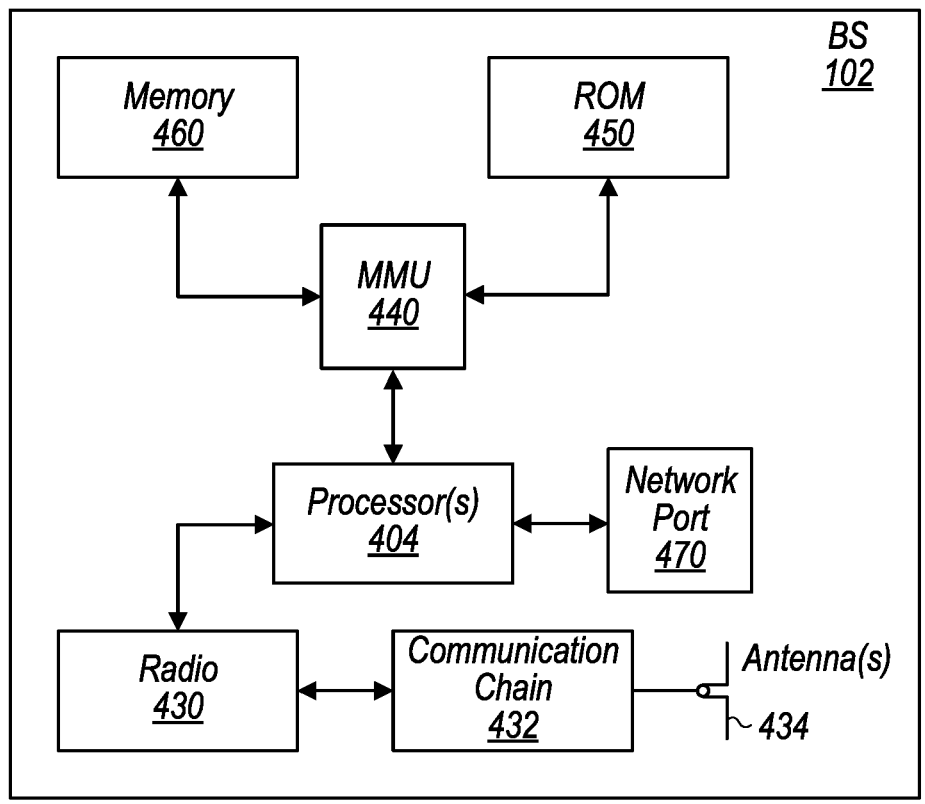
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR, LTE and Wi-Fi, LTE and UMTS, LTE and CDMA2000, UMTS and GSM, etc.).

As described further subsequently herein, the BS 102 may include hardware and software components for implementing or supporting implementation of features described herein. According to some embodiments, the processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of radio resource control procedures for remote wireless devices according to various embodiments disclosed herein, and/or any of various other of the features described herein.

Figure 5:
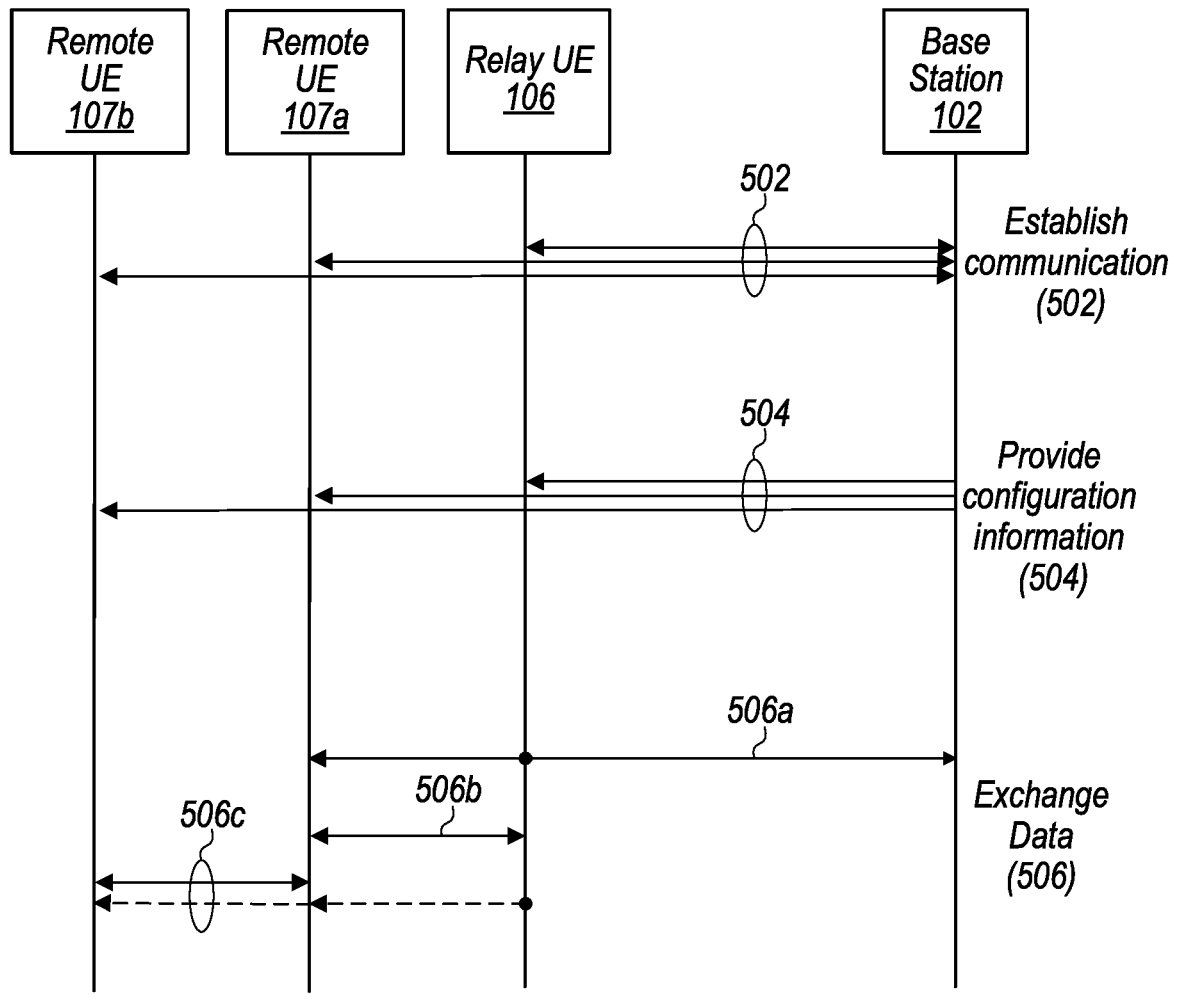
FIG. 5 is a communication flow diagram illustrating an exemplary method for performing relay communication in a wireless communication system, according to some embodiments.

FIG. 5—Communication Flow Diagram

FIG. 5 is a communication flow diagram illustrating a method for performing data forwarding procedures for remote wireless devices in a wireless communication system, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a wireless device and/or a cellular base station, such as the UEs 106A-B or 107 and/or BS 102 illustrated in and described with respect to the Figures, or more generally in conjunction with any of the computer systems, circuitry, elements, components or devices shown in the Figures, among other devices, as desired. For example, one or more processors (or processing elements) (e.g., processor(s) 302, 404, baseband processor(s), processor(s) associated with communication circuitry such as 330, 430, or 432, processors associated with various core network elements, etc., among various possibilities) may cause a UE, network element, and/or BS to perform some or all of the illustrated method elements. Note that while at least some elements of the method of FIG. 5 are described in a manner relating to the use of communication techniques and/or features associated with LTE, NR, and/or 3GPP specification documents, such description is not intended to be limiting to the disclosure, and aspects of the method of FIG. 5 may be used in any suitable wireless communication system, as desired. As shown, the method may operate as follows.

In 502, a network 100 (e.g., via a cellular base station 102) may establish communication with one or more wireless device 106 and/or 107, according to some embodiments.

In the illustrated example, the one or more wireless devices may include a UE configured to perform relay transmissions (e.g., a "relay UE", e.g., which may be an example of a wireless device 106) and two remote UEs (e.g., "remote UEs", e.g., which may be examples of accessory wireless devices 107) associated with the relay UE. It will be appreciated that any number of relay UEs and/or remote UEs may be included and that the relay UE and/or remote UEs may be any of various types of wireless devices. For example, a remote UE may bay any type of wireless device that is capable of performing wireless communication with a cellular base station indirectly via an intermediate relay UE or other wireless device (although it may also be configured to communicate with the cellular base station directly). As one possibility, a remote UE may be an accessory device, such as a smart watch or other wearable device that is configured to be a low cost and/or low power consumption wireless device. As a further example, a relay UE may be any of various types of wireless devices that is capable of supporting wireless communication between a remote UE or other wireless device and a cellular base station by acting as an intermediate relay wireless device. As one possibility, the relay UE may be a smart phone capable of acting as a companion device to the remote wireless device. Numerous other types of wireless devices are also possible as the remote UE(s) and/or the relay UE(s). The cellular base station may be any of various types of base stations that is capable of performing wireless communication with a remote wireless device indirectly via an intermediate relay wireless device, and that is capable of providing access to a cellular network. As one possibility, the cellular base station may be a 3GPP 5G NR gNB. Alternatively (or additionally), the cellular base station may be capable of operating in accordance with any of various other possible cellular communication standards.

In 504, the network 100 (e.g., via the cellular base station 102) may provide control information, (e.g., "bearer configuration information") to the one or more wireless devices, e.g., relay UE 106 and/or remote UEs 107a and 107b, according to some embodiments. The bearer configuration information may include configuration for communications between various ones of the one or more wireless device 106 and/or 107. In some embodiments, the bearer configuration information may further include configuration for communications between various any of the one or more wireless device 106 and/or 107 and the base station 102.

The bearer configuration information may configure the one or more wireless devices, e.g., relay UE 106 and/or remote UEs 107a and 107b to perform data forwarding according to one or more mode. According to a normal forward mode, a relay UE may forward data between the base station and one or more remote UE. According to a local path mode, a relay UE may exchange data with a remote UE directly (e.g., without forwarding to the base station, etc.). According to a local forward mode, a relay UE may forward data between multiple remote UEs (e.g., which may be linked or connected to the relay UE).

The bearer configuration information may configure one or more bearers according to the mode for forwarding data. The bearer(s) may be a data radio bearer(s) (DRB). Different DRBs may be configured for different segments of a connection. For example, a remote UE may connect to a relay UE via a remote DRB and a relay UE may connect to a base station using a relay DRB (e.g., via a Uu interface). Accordingly, in a normal forward mode, data may be exchanged between the remote UE and the base station using the remote DRB in combination with the relay DRB.

In some embodiments, some or all of the bearer(s) may operate (e.g., partly or entirely) as sidelink (SL) communications, e.g., according to a cellular communication standard such as NR, although other standards (or combinations thereof) are also envisioned, such as other cellular standards, Bluetooth™, wireless local area network (WLAN), etc.

In some embodiments, a relay DRB may reuse/reapply Uu link configuration information. For example, a first portion of the bearer configuration information may be provided at a first time to configure a Uu link between a relay UE and a base station. A second portion of the bearer configuration information may be provided at a second time, e.g., to configure a remote DRB between the relay UE and a remote UE. The relay UE may apply (e.g., reuse) the first portion of the bearer configuration information for relay communications between the remote UE and the base station. In some embodiments, the second portion of the bearer configuration information may indicate (e.g., explicitly or implicitly) that the relay UE should apply the first portion of the bearer configuration information for relay communications between the remote UE and the base station.

Any of the bearer(s) may be configured to operate in acknowledged mode (AM) or unacknowledged mode (UM). In AM, acknowledgements (ACK) and negative acknowledgements (NACK) may be used to indicate whether or not a transmission was received, e.g., and whether or not re-transmission is requested. In unacknowledged mode, such feedback may not be used.

The bearer configuration information may identify peer entities at various layers in various devices (e.g., the remote UE(s), relay UE, base station, and/or various core network entities). A pair of corresponding peer entities may perform corresponding functions for transmitting and receiving devices. For example, a PHY entity at a transmitter may have a peer entity that is a PHY entity at a receiver. For example, the bearer configuration information may identify that a lower layer (e.g., layers 1 and/or 2) peer entity of a remote UE is in a relay UE and an upper layer peer (e.g., layer 3) entity of the remote UE is in a potentially different device (e.g., a base station for a normal forward mode, a different remote UE for a local forward mode, or in the relay for a local path mode). For example, a remote DRB may connect the lower layer peer entities and the remote DRB in combination with a relay DRB may connect the upper layer peer entities.

In the normal forward mode, upper layer peer entities of one or more remote UE may be associated with the base station and lower layer peer entities of the remote UE(s) may be associated with a relay UE. The relay UE and base station may perform routing of packets to/from the remote UE(s) according to an identifier of the remote UE(s) (e.g., remote UE-IDs) which may be appended to or associated with the packet(s). Packet scheduling may be performed according to first-in-first-out (FIFO) or based on a prioritization scheme.

In the local path mode, upper layer and lower layer peer entities of a remote UE may be associated with a relay UE. A bearer ID (e.g., and/or logical channel (LCH) ID) may be used to route packets. The bearer ID may be associated with a remote DRB.

In the local forward mode, upper layer peer entities of a first remote UE (e.g., wireless device 107a) may be associated with a second remote UE (e.g., wireless device 107b) and lower layer peer entities of the first remote UE may be associated with a relay UE. A bearer may be configured with remote UE-IDs for the first and second remote UEs.

It will be appreciated that multiple data forwarding modes (e.g., and/or multiple bearers) may be configured concurrently (e.g., in the same bearer configuration information or subsequent bearer configuration information). For example, the bearer configuration information may configure a first data forwarding mode associated with a first service, application, data type, flow, etc. and a second data forwarding mode associated with a second service, application, data type, flow, etc. For example, the bearer configuration information may configure a relay UE to route or otherwise process packets to/from a particular remote UE differently (e.g., to different destinations and/or using different bearers) based on the service, application, data type, flow, etc. of the packets. Similarly, the bearer configuration information may configure a remote UE to process packets associated with different services differently, e.g., by associating them with different destination IDs, bearer IDs, LCH IDs, etc. Thus, routing and processing may be specific to the device(s) and/or service(s) associated with each packet. Moreover, it will be appreciated that a remote UE may be configured to operate in a non-forwarding mode for some services and may communicate packets associated with such a service directly with the base station, according to some embodiments. For example, a remote UE may be configured to transmit data of a fitness application to a relay UE using a local path mode bearer and to transmit data of a gaming application to a network using a normal forward mode bearer; a relay UE may process/forward these different types of data differently, based on the bearer configuration information associated with the bearers. As another example, a first remote UE may transmit audio data to a second remote UE (e.g., using a first local forward mode DRB) and may transmit data related to the position or motion of the first UE to a third remote UE (e.g., using a second local forward mode DRB). Again, a relay UE may process/forward these different types of data differently, based on the bearer configuration information associated with the different bearers.

For example, one remote UE operating in a normal forward mode may have multiple remote DRBs configured, e.g., for different modes. For example, the remote UE's DRB #1 may be configured for normal forwarding mode and the remote UE's DRB #2 for local path mode. The network may configure the relay UE to forward these different DRBs differently, e.g., based on the different DRB IDs of the different DRBs, the relay UE may forward according to the different modes.

The bearer configuration information may be provided by upper layer signaling. For example, the bearer configuration information may be provided by one or more RRC messages, such as one or more RRC reconfiguration messages, among various possibilities.

In some embodiments, the bearer configuration information provided to different ones of the relay UE and/or remote UE(s) may be different, e.g., the bearer configuration information may be specific to each individual UE. For example, the base station or network may provide complementary bearer configuration information to the different UEs. For example, bearer configuration information for a relay UE may specify that a particular remote UE (or potentially multiple remote UEs) identified by a remote UE-ID may transmit using a particular DRB (identified by a bearer ID or LCH ID, etc.) for a particular forwarding mode, and may identify a destination (e.g., a particular layer within the relay UE or another device for the data). Similarly, bearer configuration information for a relay UE may specify corresponding information for transmissions to a particular remote UE (e.g., identified by a remote UE-ID) using a particular DRB for a particular forwarding mode.

In some embodiments, the bearer configuration information may be based on data identification, e.g., instead of or in addition to DRB identification. For example, the relay UE may recognize different types of data based on QoS flow information and/or IP flow information, and may use this information to route data on various bearers. Such data identification information may be used instead of or in addition to DRB ID.

It will be appreciated that the bearer configuration information of 504 may be distinct from various other types of control information transmitted by the base station. For example, the UE-specific bearer configuration information of 504 may be different than broadcast control information such as may be used for device-to-device (D2D) discovery communications, e.g., which may not be UE-specific.

In 506, the one or more wireless device 106 and/or 107 and/or the network 100 (e.g., via cellular base station 102) may exchange data according to the bearer configuration information, according to some embodiments. The three data forwarding modes discussed above are illustrated separately, however, as noted above the three modes may operate individually, concurrently, or sequentially.

506a illustrates the normal forward mode. As shown, wireless device 107a (e.g., a remote UE) may exchange data with network 100/base station 102 via wireless device 106 (e.g., a relay UE). The relay UE may relay data between the remote UE and the base station using a bearer configured by the base station. Packets to/from the remote UE may be identified by a remote UE-ID.

506b illustrates the local path mode. As shown, wireless device 107a (e.g., a remote UE) may exchange data with wireless device 106 (e.g., a relay UE). Data may be exchanged between the two wireless devices according to the local path mode without being exchanged with the base station. Note that other data (e.g., of a different service) may be exchanged with the base station according to a different data forwarding mode, according to some embodiments.

506c illustrates the local forward mode. As shown, wireless device 107a (e.g., a first remote UE) may exchange data with wireless device 107b (e.g., a second remote UE) via wireless device 106 (e.g., a relay UE). The solid arrow may indicate the two remote UEs as the endpoints of the data exchange and the dashed arrow may indicate the path of the data via the relay UE. Data may be exchanged between the two remote UEs according to the local forward mode without being exchanged with the base station. Note that other data (e.g., of a different service) may be exchanged with the base station according to a different data forwarding mode, according to some embodiments.

It will be appreciated that the remote and relay wireless devices may establish connections (e.g., direct connections between a remote UE and a relay UE) at any time. For example, a remote UE and a relay UE may connect prior to or concurrently with establishing connection with a base station (e.g., prior to or concurrently with 502), after establishing connection with the base station (e.g., between 502 and 504), or after receiving bearer configuration information (e.g., subsequent to 504). In some embodiments, a connection between wireless devices may be established in response to the bearer configuration information. In some embodiments, an existing connection between wireless devices may be modified based on the bearer configuration information. For example, a previous non-cellular connection may be replaced with a cellular connection according to a bearer configuration information for a cellular DRB for relay communication.

FIGS. 6-17 and Additional Information

FIGS. 6-17 and the following additional information are provided as being illustrative of further considerations and possible implementation details relating to the method of FIG. 5, and are not intended to be limiting to the disclosure as a whole. Numerous variations and alternatives to the details provided herein below are possible and should be considered within the scope of the disclosure.

Figure 6:
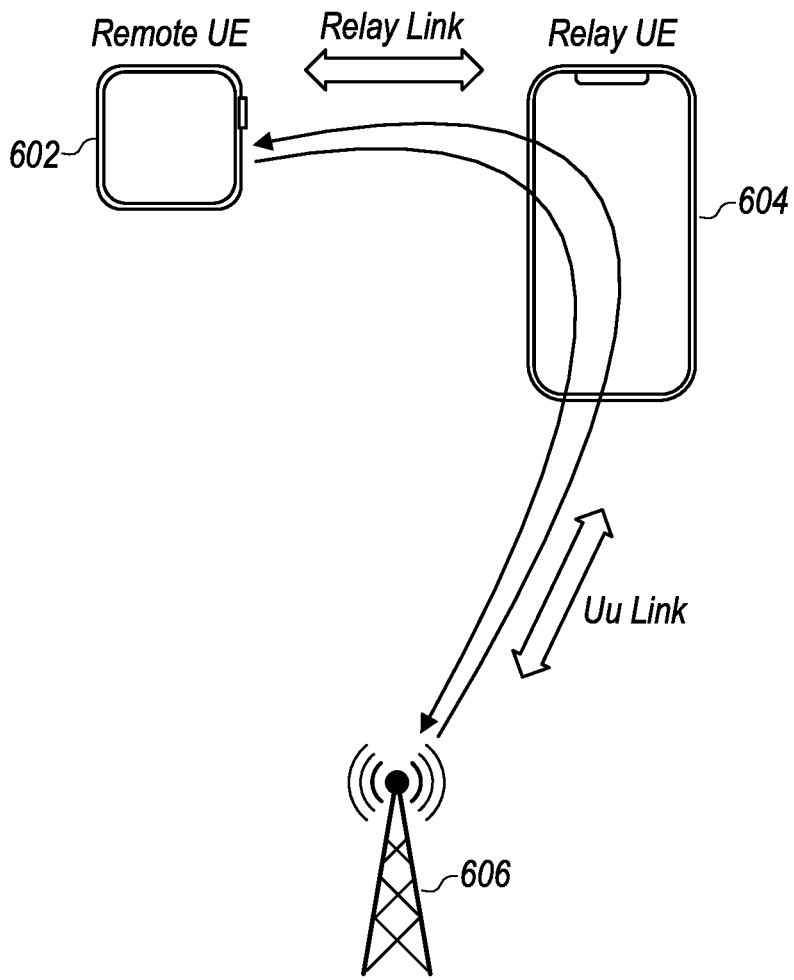
FIG. 6 illustrates aspects of a possible wireless communication relay between a remote UE, a relay UE, and a gNB, according to some embodiments.

3GPP 5G NR cellular communication techniques are being developed for a variety of use cases, including enhanced mobile broadband (eMBB), ultra reliable low latency communications (URLLC), and massive machine type communication (mMTC). The mMTC use case may include widespread deployment of wireless devices designed to have relatively low cost and/or low power consumption. Such devices may include wearable devices, appliances, process control devices, measurement devices, and/or any of a variety of other types of devices. In at least some embodiments (e.g., wearable devices, in some instances), it may be the case that such a device may commonly be within relatively close proximity to another wireless device (e.g., a smart phone, in some instances) that can serve as a relay for communications with a cellular network. Accordingly, it may be beneficial, at least in some embodiments, to support a UE to NW communication relay framework, e.g., to help support operation of low cost and/or low power consumption wireless devices that may be capable of benefiting from such a framework. For example, FIG. 6 illustrates aspects of one possible example wireless communication relay between a remote UE 602, a relay UE 604, and a cellular base station 606. As shown, in the illustrated scenario the remote UE 602 may be able to communicate with the cellular base station 606 by way of a relay link between the remote UE 602 and the relay UE 604 as well as a Uu link between the relay UE 604 and the cellular base station 606. In some embodiments, the remote UE 602 may additionally connect to the base station 606 using a direct connection (not shown).

Figure 7:
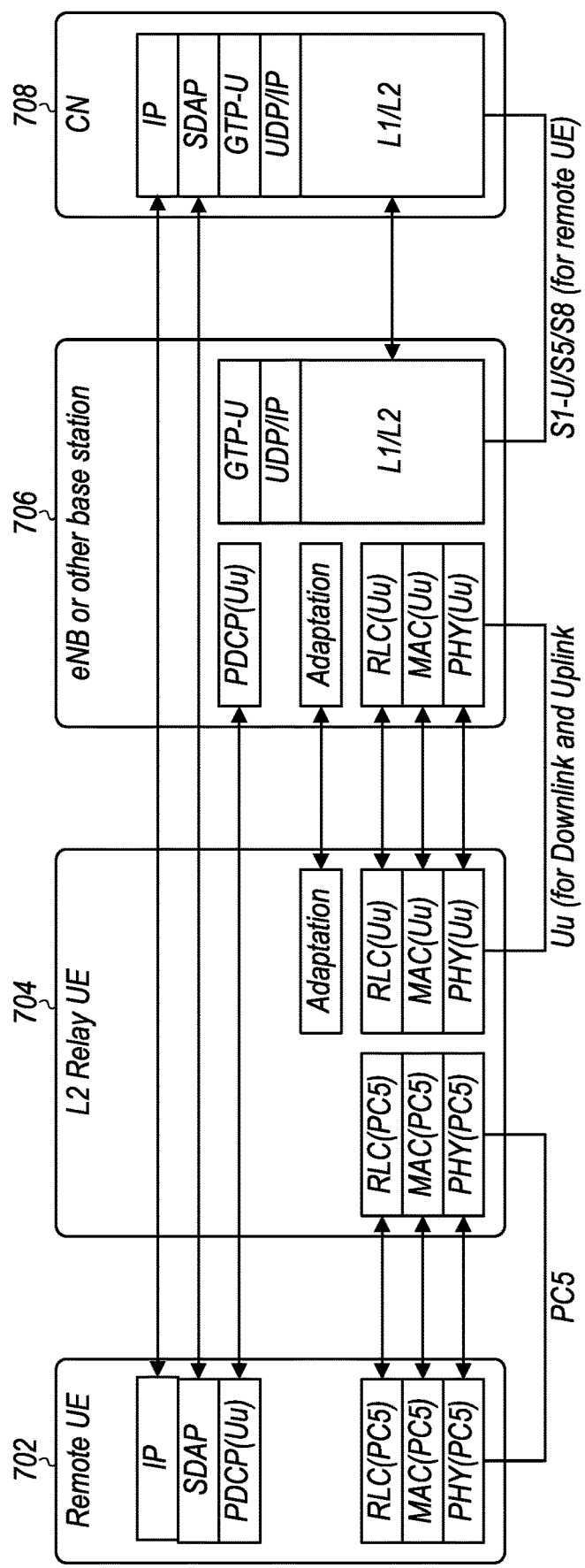
FIGS. 7-8 illustrate exemplary aspects of possible protocol stack architectures for user plane and control plane communications in a 3GPP based UE-to-network relay framework, according to some embodiments.
Figure 8:
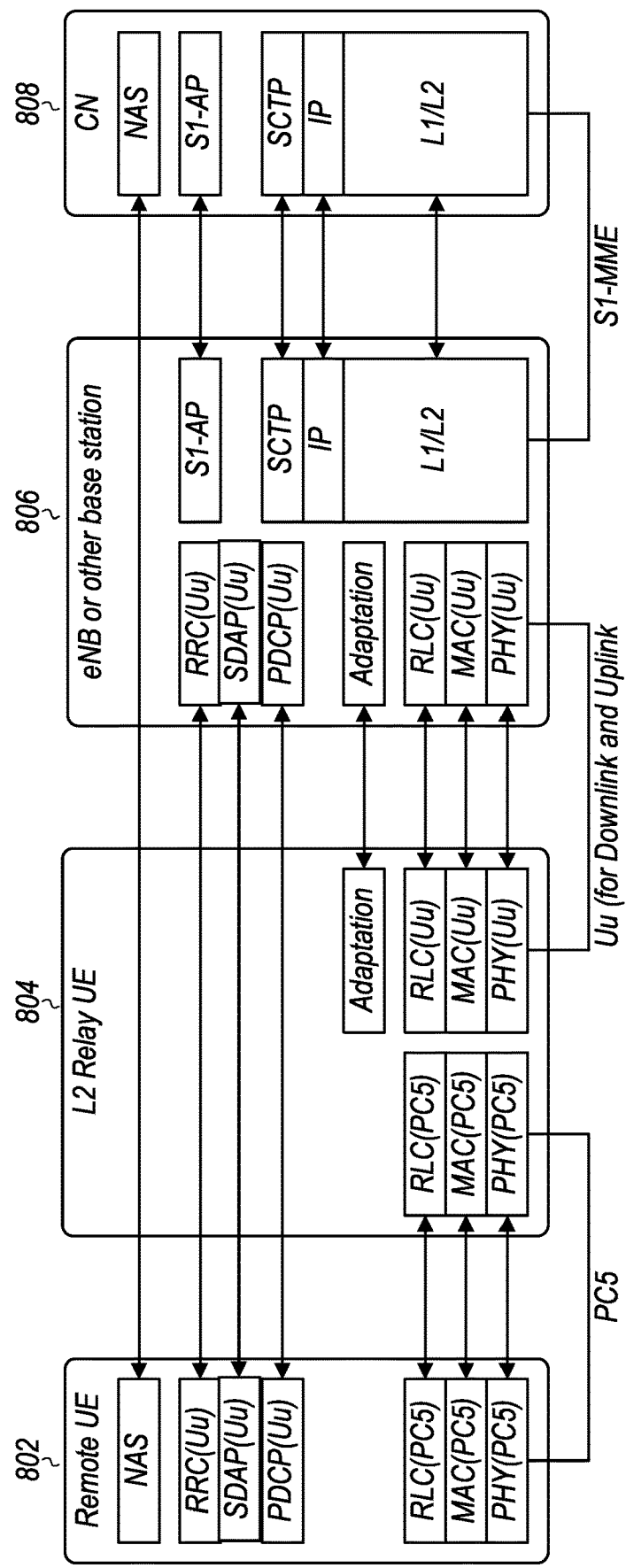

According to various embodiments, there may be multiple possible types of UE to NW relay frameworks. As one possibility, a layer 3 (L3) relay may be used, which may be implemented without impact to access stratum communication layers, at least in some instances. As another possibility, a layer 2 (L2) relay may be used, for example by establishing and maintaining a radio resource control connection that is terminated between the remote UE and the cellular base station, among various possibilities. FIGS. 7-8 illustrate exemplary aspects of possible protocol stack architectures for user plane and control plane communications in a 3GPP based UE-to-network relay framework in which the communication relay is implemented at layer 2, according to some embodiments.

More particularly, FIG. 7 illustrates the user plane radio protocol stack for a layer 2 UE to network relay that utilizes a PC5 interface between a remote UE 702 and a relay UE 704 to provide a communication link between the remote UE 702 and a base station 706, and to a core network (CN) 708 to which the base station 706 provides access. Note that different layers may have peer entities in different devices. For example, the peer entity of the remote UE's RLC layer is in the relay UE, the peer entity of the remote UE's PDCP layer is in the base station, and the peer entity of the remote UE's IP layer is in the core network.

Similarly, FIG. 8 illustrates the control plane radio protocol stack for a layer 2 UE to network relay that utilizes a PC5 interface between a remote UE 802 and a relay UE 804 to provide a communication link between the remote UE 802 and a base station 806, and to a core network 808 to which the base station 806 provides access. As shown, the relaying may be performed above the RLC sublayer. The Uu PDCP and RRC links may be terminated between the remote UE and the base station, while RLC, MAC, and PHY, and the non-3GPP transport layers, are terminated in each link (e.g., the link between the remote UE and the relay UE, and the link between the relay UE and the base station).

In some embodiments, RRC connection procedures may be performed between a UE and a network via a direct connection over a Uu interface, e.g., in accordance with 3GPP based cellular communication. For a RRC connection procedure between a remote UE, in which the peer RRC entity is terminated at the remote UE and at the network, the RRC message transmission may be forwarded via a relay UE, e.g., such that there may be an additional relay link between the relay UE and the remote UE in addition to a Uu link between the relay UE and the network. Since the Uu link and the relay link may be maintained independently, it may be possible for a remote RRC procedure to fail due to breakage of either the relay link or the Uu link. Accordingly, it may be important to carefully design a RRC procedure framework to support remote UEs' capability to perform RRC procedures.

According to some embodiments, a remote UE's RRC message delivery via a Uu link may be performed via relay signaling radio bearers (SRBs) that are established between the network and the relay UE. The network may be able to establish one or multiple relay SRBs. It may be the case that all relay SRBs are configured in radio link control (RLC) acknowledged mode (AM).

In some embodiments, a relay UE may support data forwarding functionality, e.g., to forward a remote UE's data via relay link to/from a network via a Uu link. The network may establish one or multiple relay data radio bearers (DRBs). Such relay DRBs may be configured in RLC AM mode or UM mode. A network may provide the Uu link scheduling, e.g., the network may perform scheduling in the relay DRB level. For example, the network may schedule relay traffic using a Uu link (e.g., relay DRB). The remote UE and relay UE may schedule relay traffic using a remote DRB.

In some embodiments, one relay DRB may carry data from/to multiple remote UEs. In order to distinguish data of different remote UEs within one relay DRB, each data packet of remote UE may be transmitted together with an identifier of the remote UE (e.g., remote UE-ID). A remote UE-ID may be included in a header of a packet, e.g., in an adaptation layer (AL) header, or otherwise appended to or associated with the packet. A remote UE-ID may use an index such as a radio network temporary identifier (RNTI), cell RNTI (C-RNTI), temporary RNTI (T-RNTI), or other naming convention to identify the remote UE.

Normal Forward Mode

Figure 9:
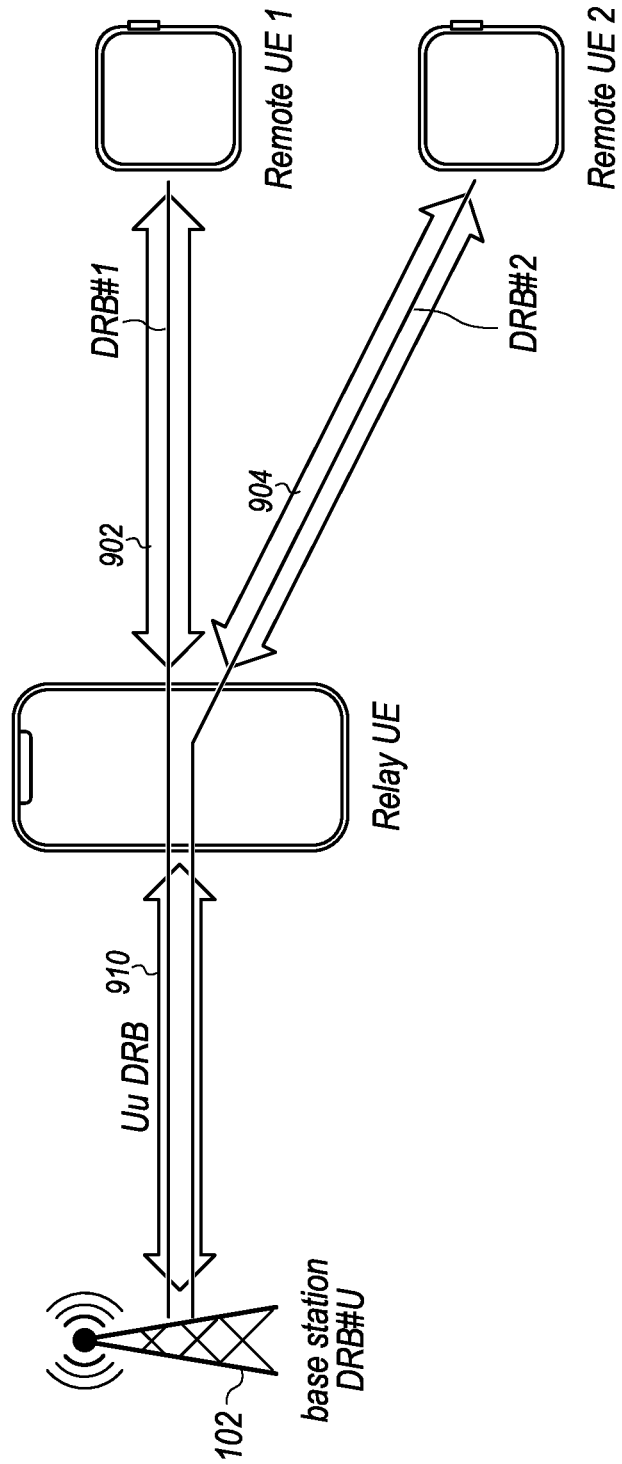
FIG. 9 illustrates aspects of a possible wireless communication relay between two remote UEs, a relay UE, and a gNB, according to some embodiments.

A remote UE-ID may be useful in a normal forward mode, among various possibilities. In a normal forward mode, a relay UE may forward data between one or more remote UE and a base station, e.g., as illustrated in FIG. 9, according to some embodiments. As shown, a base station 102 may establish a connection with two (e.g., or any number of) remote UEs via a relay UE. A first DRB (e.g., with a first identifier, e.g., DRB #1) may connect the base station and a first remote UE; a second DRB (e.g., DRB #2) may connect the base station and the second remote UE. Both DRBs may use a link (910, e.g., a Uu interface) between the relay UE and the base station. The DRBs may use links (e.g., 902, 904, respectively, between the remote UEs and the relay UE. The links 902, 904 may be sidelink (SL) links and/or may operate according to a cellular standard such as NR. Packets associated with (e.g., to or from) the different remote UEs may be associated with corresponding remote UE-IDs.

In some embodiments, lower layer peer entities may correspond between the relay UE and a remote UE while upper layer peer entities may correspond between the base station and the remote UE. For example, peer entities for a remote UE's Service Data Adaptation Protocol (SDAP) layer and Packet Data Convergence Protocol (PDCP) may be located in the base station. A remote UE's RLC layer, media access control (MAC) layer and physical (PHY or L1) layer may have peer entities in a relay UE.

In a normal forward mode, when a network provides bearer configuration information (e.g., in 504), the network may provide bearer configuration (e.g., of a relay DRB and/or one or more remote DRBs) to a remote UE. The bearer configuration information may be provided to the remote UE directly (e.g., via a direct link from the base station) and/or via the relay UE (e.g., using a relay SRB). The network may also provide the remote UE's DRB and the relay UE's DRB mapping configuration to relay UE. The network may provide the remote UE's bearer forward mode to the relay UE. For example, the bearer configuration information may indicate to the relay UE the DRB configuration, the remote UE-ID of the remote UE, and that the remote UE is configured to use a normal forward mode for its data (e.g., via the relay UE and the DRB).

Figure 10:
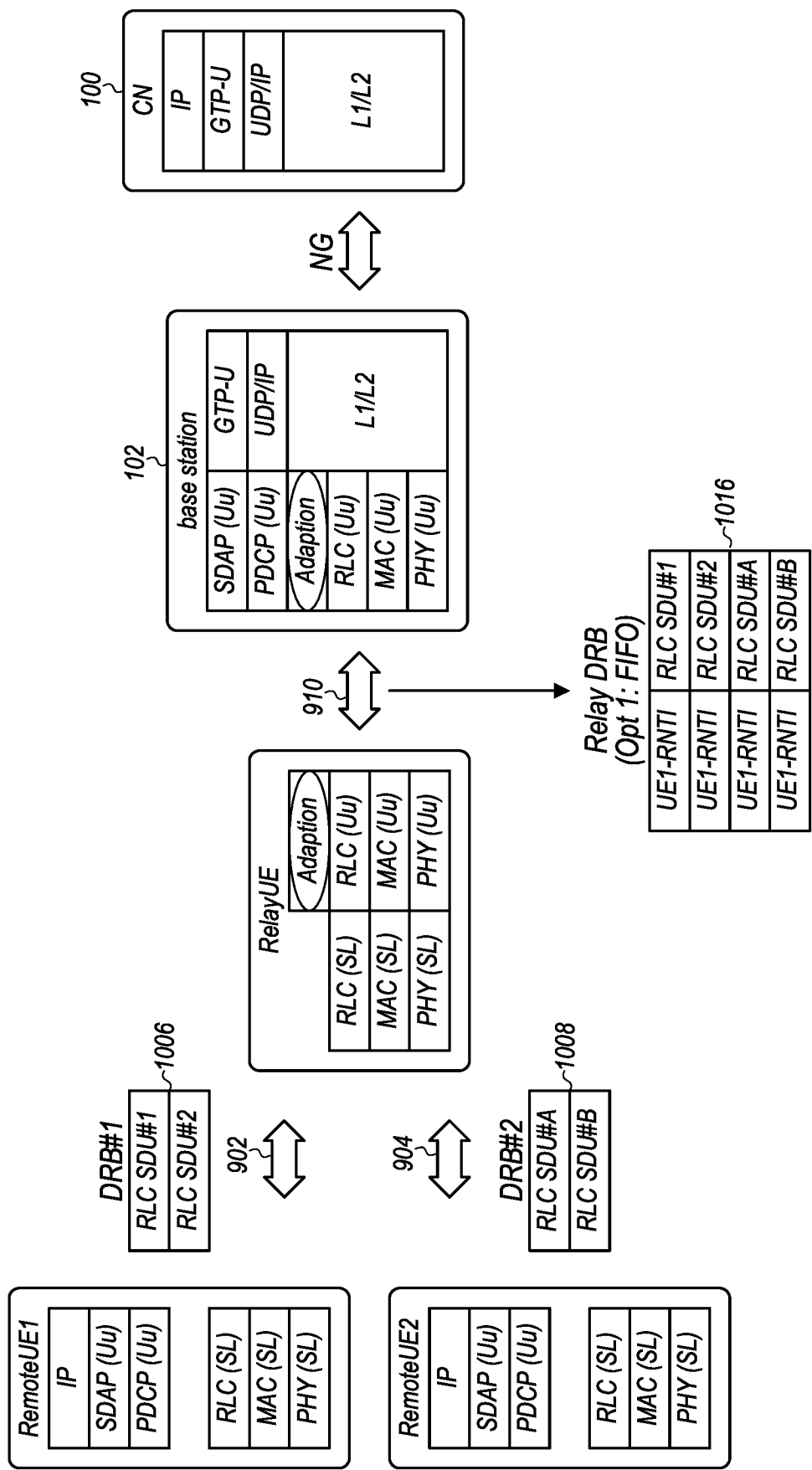
FIGS. 10-12 illustrate aspects of a normal forward mode, according to some embodiments.

FIG. 10 illustrates an example bearer configuration for a normal forward mode, according to some embodiments. FIG. 10 illustrates a normal forward mode DRB configuration, e.g., using the wireless communication system of FIG. 9, including protocol stack information.

As shown, bearers with corresponding bearer/DRB ID values may be established between the remote UEs and the network (e.g., via the relay UE). For the 3GPP SL connections 902 and 904, the bearer configuration may, reuse the Uu information. For example, the DRBs #1 and #2 may have separate SL components (902 and 904) but shared Uu information (e.g., connecting the relay UE with the base station 102 and the core network 100).

For example, to transmit a packet using DRB #1, the remote UE #1 may generate data at an internet protocol (IP) layer which may have a peer entity in the core network 100. The SDAP and PDCP layers of the remote UE #1 may process the data for corresponding peer entities in the base station 102. The data may be mapped to DRB #1 by the SDAP layer. The RLC layer of the remote UE may form the data into service data units (SDUs), e.g., RLC SDU #1 and #2 for a (e.g., SL) peer entity in the relay UE. The MAC and PHY layers of the remote UE may transmit the SDUs #1 and #2 over the link 902 to the relay UE.

The PHY layer (e.g., a SL portion of the PHY layer) of the relay UE may receive the SDUs #1 and #2 over the link 902. The (e.g., SL portions of the) MAC and RLC layers may process the SDUs. An intermediate layer (e.g., the adaptation layer) of the relay UE may determine that the SDUs are mapped to DRB #1 of the remote UE #1. In response, the intermediate layer may determine to relay the SDUs #1 and #2 along with the remote UE #1's remote UE-ID to the base station 102 (e.g., instead of providing the SDUs to upper layers of the relay UE). Thus, the (e.g., Uu portions of the) RLC, MAC, and PHY layers of the relay UE may process and transmit the SDUs #1 and #2 with the appended remote UE-ID over the (e.g., Uu) interface 910 to the base station 102. It will be appreciated that the RLC SDUs can be ordered based on a first-in-first-out (FIFO) system or based on a prioritization system. These systems are described further below. The illustrated example, shows a FIFO ordering (1016).

The base station may receive the SDUs #1 and #2 and provide them to the core network 100. Although this example has been described in the uplink direction, it will be appreciated that an analogous process may be applied in the downlink direction. For example, data for the remote UE #1 may be provided to the base station 102 by the network 100 in the form of one or more SDUs addressed to remote UE #1. The base station may append the remote UE-ID of remote UE #1, map the SDUs to the DRB #1, and transmit the SDUs to the relay UE via mapped relay-DRB. The relay UE may receive the SDUs over the interface. The relay UE may (e.g., at an adaptation layer or other intermediate layer) determine, based on the remote UE ID, to relay the SDUs to the remote UE. The relay UE may transmit the SDUs to remote UE #1 via the link 902.

Thus, the relay UE may forward RLC SDUs from/to the relay link to/from the (e.g., Uu) link with the base station. For SDUs from the relay link to the Uu link, the relay UE may include the remote UE-ID together with the remote UE's RLC SDUs in the RLC protocol data unit (PDU) and may transmits it to the base station via the mapped relay DRB. For SDUs from the base station (e.g., Uu link) to the remote UE (e.g., the relay link), the relay UE may identify the RLC SDU's owner via the remote UE-ID and forwards it to the appropriate remote UE (e.g., using the appropriate relay link, e.g., 902 or 904).

Figure 11:
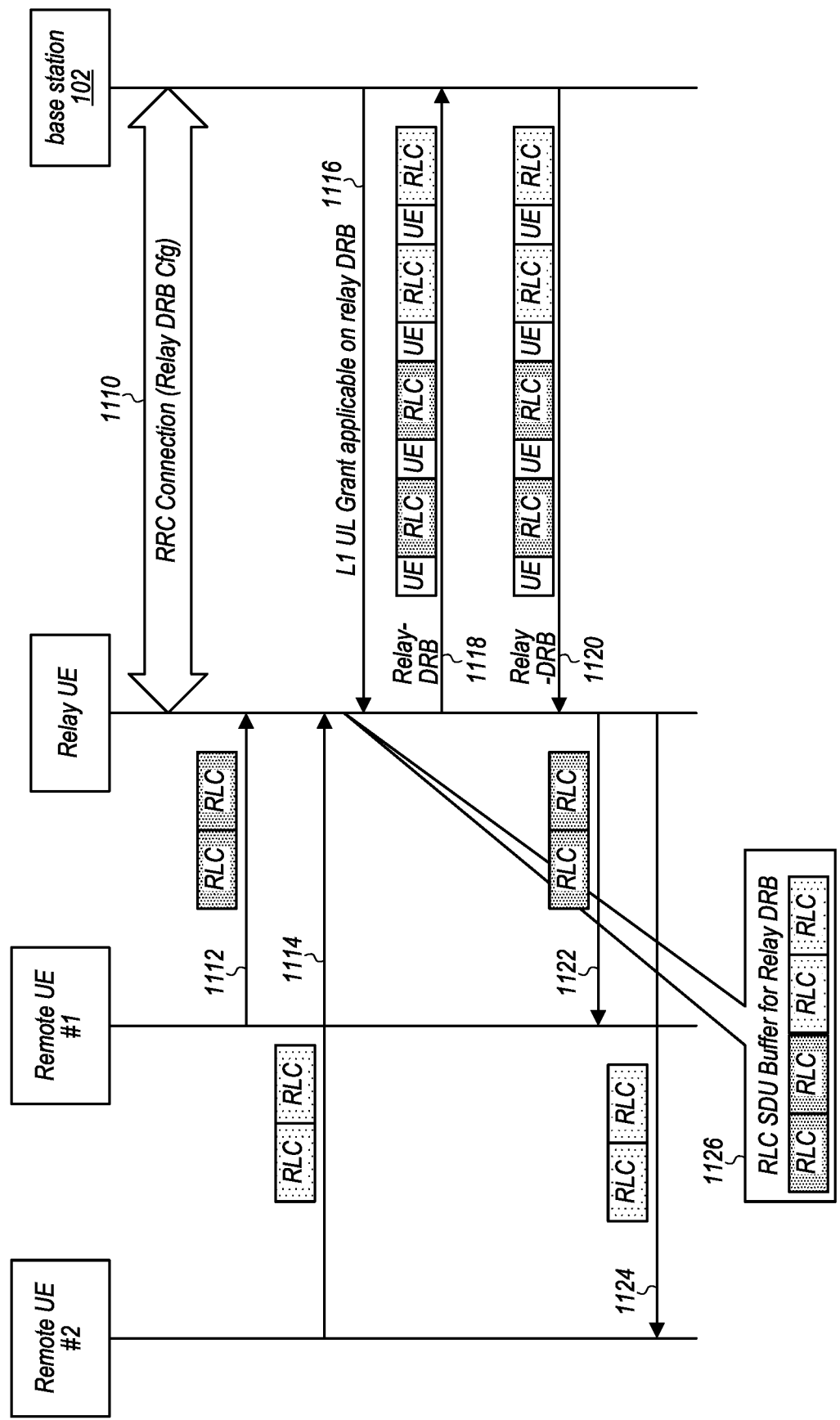

FIG. 11 is a communication flow diagram providing further detail about FIFO processing, according to some embodiments. In 1110, the base station and relay UE may establish an RRC connection and may configure a relay DRB. The relay DRB may be used for data traffic for remote UEs #1 and #2. In some embodiments, the relay DRB may also be used for data traffic of the relay UE. The base station may also provide the relay UE with bearer configuration information for remote DRBs associated with the remote UEs.

Bearer configuration information provided from the base station to the relay UE (and possibly the remote UEs) may indicate that a FIFO ordering scheme will be used for relay data, e.g., on the remote DRBs and/or relay DRB. In 1112, the remote UE #1 may transmit two RLC SDUs to the relay UE. The relay UE may add the SDUs to its buffer for transmission to the base station on the relay DRB. In 1114, the remote UE #2 may transmit two RLC SDUs to the relay UE. The relay UE may add the SDUs to its buffer for transmission to the base station on the relay DRB. The SDUs of remote UE #1 may be first in the buffer 1126 because they were received by the relay UE prior to the SDUs of remote UE #2. In 1116, the base station may transmit a grant to the relay UE. The grant may be transmitted on an SRB. The grant may include uplink and/or downlink resources applicable to the relay DRB.

In 1118, in response to available uplink resources, the relay UE may transmit the RLC SDUs of the remote UEs #1 and #2 to the base station via the relay DRB. The SDUs may be transmitted in the order they were received by the relay UE (e.g., FIFO). The respective SDUs may each be transmitted with a remote UE-ID of the remote UE from which they were received.

In 1120, the base station may transmit downlink SDUs to the relay UE for relay transmission to the remote UEs #1 and #2. The respective SDUs may each be transmitted with a remote UE-ID of the remote UE to which they are intended, and the relay UE may forward the SDUs on respective remote DRBs according to the UE-IDs. The relay UE may relay the SDUs to the remote UEs in the order that they are received from the base station (e.g., FIFO). Thus, as the SDUs for remote UE #1 are received first, they may be transmitted first (1122). The SDUs for remote UE #2 may be transmitted second (1124).

Figure 12:
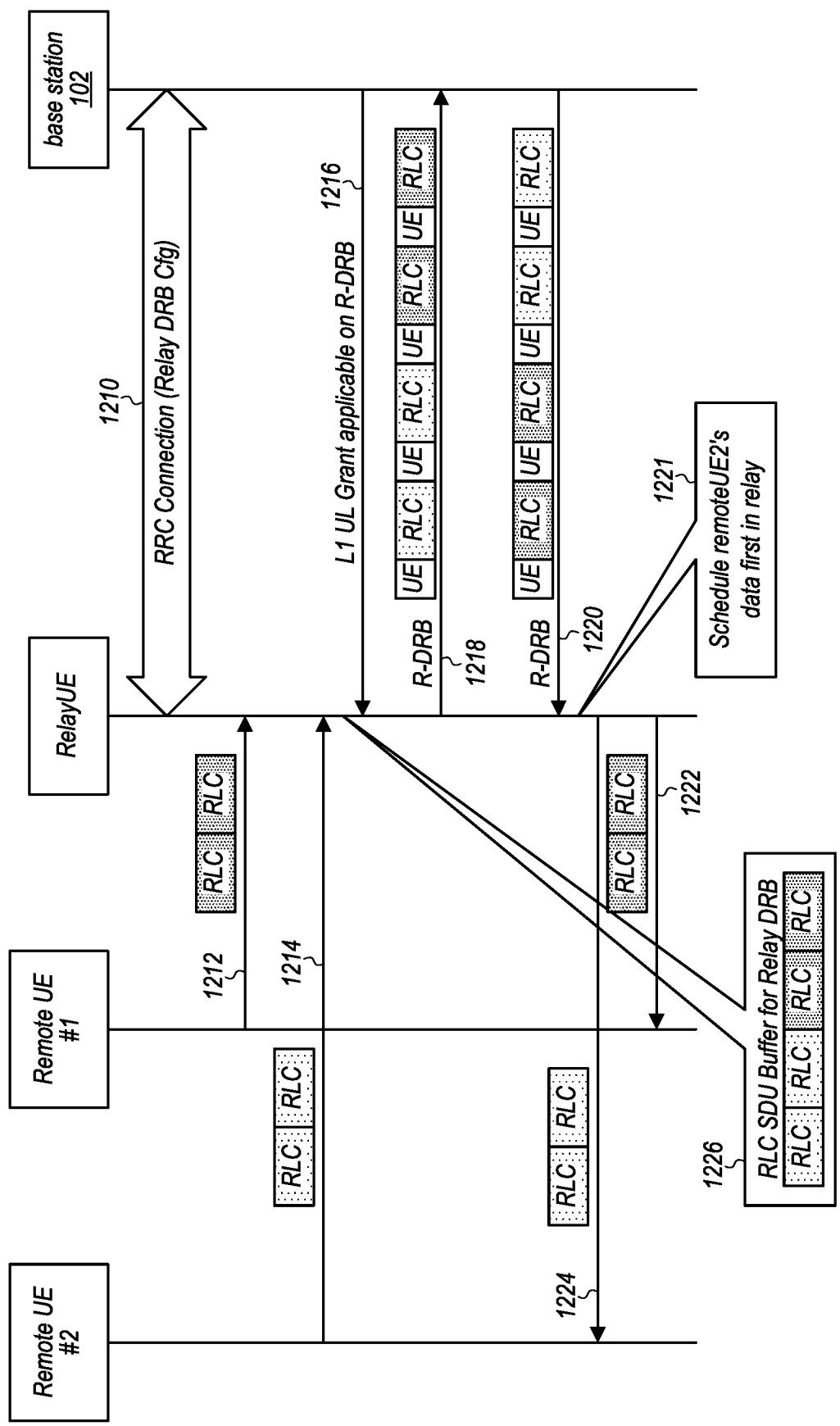

FIG. 12 is a communication flow diagram providing further detail about prioritized processing, according to some embodiments. In 1210, the base station and relay UE may establish an RRC connection and may configure a relay DRB and possibly remote DRBs, e.g., as discussed above regarding 1110. Bearer configuration information provided from the base station to the relay UE (and possibly the remote UEs) may indicate that a prioritized ordering scheme will be used for relay transmissions. Further, the bearer configuration information may indicate relative priorities of the remote UEs. For example, the bearer configuration information may indicate that remote UE #1 is a lower priority than remote UE #2, among various possibilities. In 1212, the remote UE #1 may transmit two RLC SDUs to the relay UE. The relay UE may add the SDUs to its buffer for transmission to the base station on the relay DRB. In 1214, the remote UE #2 may transmit two RLC SDUs to the relay UE. The relay UE may add the SDUs to its buffer for transmission to the base station on the relay DRB. The SDUs of remote UE #2 may be first in the buffer 1226 because of remote UE #2's higher priority than remote UE #1. In 1216, the base station may transmit a grant to the relay UE. The grant may be transmitted on an SRB. The grant may include uplink and/or downlink resources applicable to the relay DRB.

In 1218, in response to available uplink resources, the relay UE may transmit the RLC SDUs of the remote UEs #1 and #2 on the relay DRB. The SDUs may be transmitted in the order they were stored in the buffer by the relay UE (e.g., based on the prioritization scheme). The respective SDUs may each be transmitted with a remote UE-ID of the remote UE from which they were received.

In 1220, the base station may transmit downlink SDUs to the relay UE for relay transmission to the remote UEs #1 and #2. The respective SDUs may each be transmitted with a remote UE-ID of the remote UE to which they are intended, and the relay UE may forward them according to the UE-IDs, e.g., on corresponding remote DRBs. The relay UE may relay the SDUs to the remote UEs in the order prioritized order (1221). Thus, as the SDUs for remote UE #2 are higher priority, they may be transmitted first (1222), even though they were received by the relay UE after the packets for remote UE #1. The SDUs for remote UE #1 may be transmitted second (1224).

In some embodiments, SDUs of the remote UEs may be transferred (in the uplink and/or downlink direction) with SDUs of the relay UE. In a FIFO system, all of the SDUs may be ordered for transmission according to the order they were received (e.g., by the RLC of the relay UE in the case of uplink packets or by the base station in the case of downlink packets). In a prioritized ordering system, the packets may be ordered for transmission according to priority of the packets, e.g., or of the UE with which they are associated.

In some embodiments, bearer configuration information may explicitly or implicitly indicate an ordering scheme (e.g., FIFO, prioritized, etc.) to be used. In some embodiments, the relay UE may select an ordering scheme, e.g., autonomously.

It will be appreciated that although the examples of FIGS. 11 and 12 illustrate buffering of uplink transmissions, buffering of downlink transmissions may also occur. For example, a relay UE may receive a plurality of downlink data packets for one or more remote UEs and may store those in a buffer until resources are available for transmission to the remote UE(s). Scheduling of such downlink packets may be ordered according to FIFO and/or prioritization.

Local Path Mode

Figure 13:
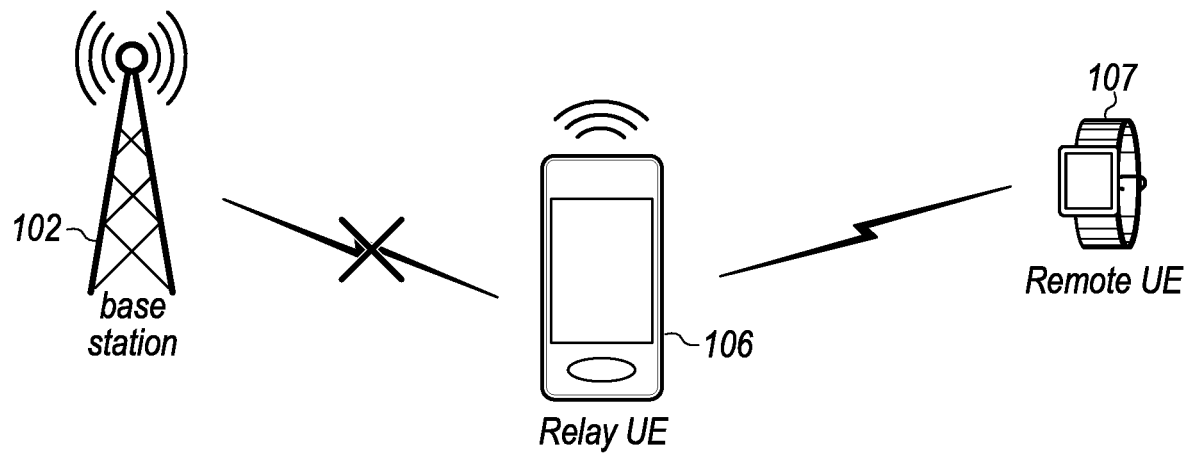
FIGS. 13-15 illustrate aspects of a local path mode, according to some embodiments.

FIG. 13 illustrates a local path mode. In the local path mode, a relay UE (e.g., a UE 106) may terminate data from a remote UE (e.g., an accessory device 107) and may not forward it to a network (e.g., or base station 102). For example, data to/from the remote UE may not be transmitted to/from the network via relay UE; instead the remote UE and relay UE may exchange data between themselves. It will be appreciated that the crossed out path (e.g., a Uu link) between the relay UE and the base station indicates that no relay data is transferred. The relay UE may still communicate with the base station for various purposes. For example, the base station may provide bearer configuration information configuring a local path mode DRB between the remote UE and the relay UE. Similarly, bearer configuration information may be relayed by the relay UE to/from the remote UE, e.g., using a SRB. Note that either or both of the relay UE and/or remote UE may separately exchange data with the base station/network using a direct connection, according to some embodiments.

Figure 14:
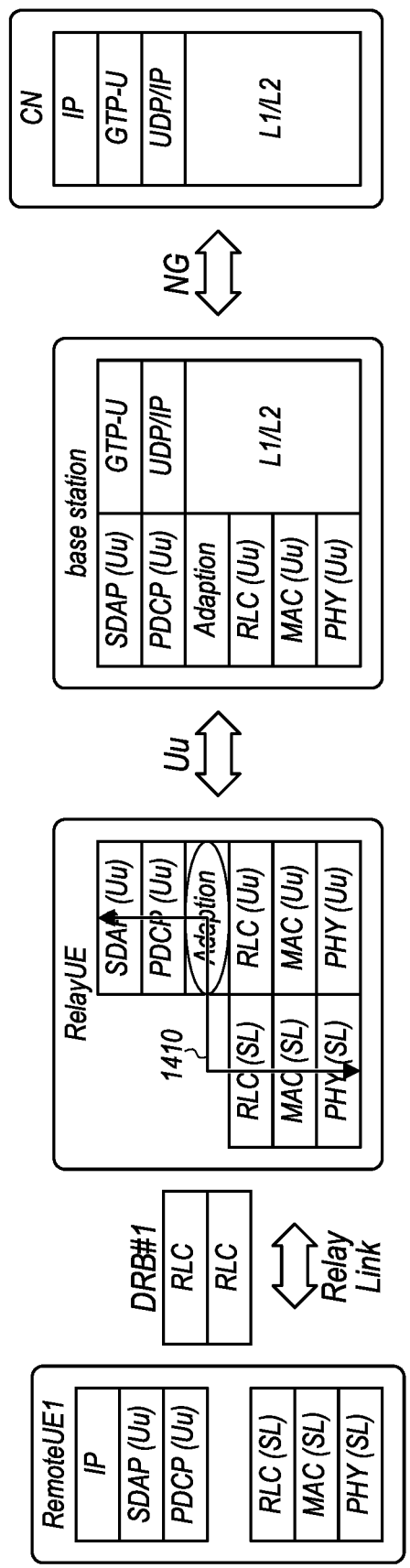

FIG. 14 illustrates the communication system of FIG. 13 with further detail about protocol stacks, according to some embodiments. Peer entities for both upper and lower layers of the remote UE may be in the relay UE. For example, the remote UE's SDAP layer and PDCP layer may have peer entities are in the relay UE. Further, the remote UE's RLC layer, MAC layer and L1 (e.g., PHY) layer peer entities may be in the relay UE.

For user plane operation of the local path DRB, data of the local path DRB may generally follow the path indicated by 1410 within the relay UE. For example, the relay UE may (e.g., at an adaptation layer or other intermediate layer) identify the remote UE and bearer in local path mode. For example, data received from the remote UE on the local path DRB may be forwarded by the application layer to a linked PDCP entity (e.g., within the relay UE, e.g., according to the bearer configuration information). Similarly, the adaptation layer or other intermediate layer of the relay UE may transmit data from the PDCP entity which is in local path mode to an RLC entity in its relay link (e.g., an SL RLC entity) protocol stack.

During operation of the relay UE for the remote UE's bearer in local path mode, when the relay UE receives the data from remote UE via the relay link, the relay UE may identify the bearer in local path mode according to the corresponding RLC bearer ID/LCH ID. Based on identifying that the data is associated with the local path, the relay UE may forward the data of this bearer to the corresponding PDCP layer based on the RLC bearer ID. When the relay UE transmits data (e.g., from an application or other upper layer of the relay UE) to the remote UE via the relay link, the relay UE PDCP layer may deliver its data to the corresponding RLC entity in the relay link, and forwards it via the relay link.

Figure 15:
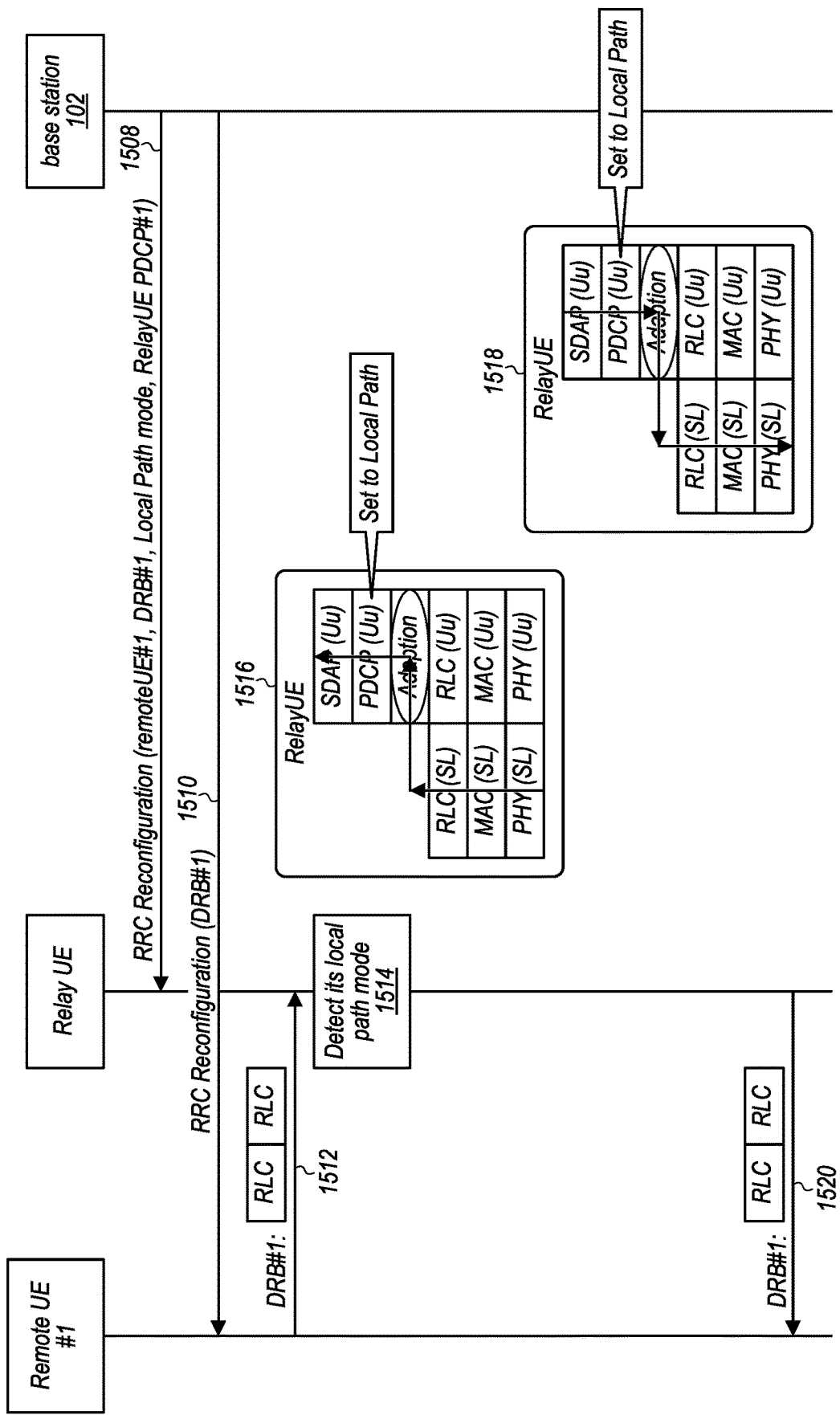

FIG. 15 is a communication flow diagram illustrating operation of the local path DRB of FIG. 14, according to some embodiments. The base station may provide the relay UE with configuration (e.g., control plane) information relevant to the local path mode (1508). For example, the network may provide bearer configuration information (e.g., in 504) that configures the relay UE about the DRB in local path mode. The bearer configuration information may identify the corresponding PDCP entities in the remote UE and in the relay UE (e.g., the PDCP Uu entity). The network may configure the relay UE to implement the bearer in local path mode, and may optionally configure a mapped relay DRB in the Uu link. The network may configure the relay UE's PDCP/SDAP layers with information about the mapped RLC bearer ID or logical channel (LCH) ID or other mapping information. For example, the bearer configuration information may indicate that bearer ID DRB #1 may correspond to local path mode data transfers with remote UE #1 and may use PDCP instance #1 (e.g., Uu) of the relay UE. Similarly, the bearer configuration information may indicate that SDAP instance #1 may also be used for the local path (e.g., DRB #1).

The network may provide the bearer configuration to the remote UE (1510). The bearer configuration information may be provided by RRC message (e.g., RRC reconfiguration) or other higher layer signaling. It will be appreciated that the illustrated sequence of 1508 and 1510 is exemplary. The bearer configuration information to the UEs may be provided in any order or concurrently.

The remote UE may transmit data (e.g., two RLC SDUs) to the relay UE via the DRB (1512). The relay UE may determine that the data is associated with local path mode based on receiving the data from the DRB #1 (1514). Accordingly, as shown in 1516, the relay UE may transmit the data through SL instances at the lower layers. The adaptation layer or other intermediate layer of the relay UE may route the data according to the local path on upper layers within the relay UE (e.g., PDCP and SDAP Uu instances and beyond).

Similarly, for data from upper layers of the relay UE, the adaptation layer or other intermediate layer may route data through SL instances at the lower layers (1518) for transmission to the remote UE (1520).

Local Forward Mode

Figure 16:
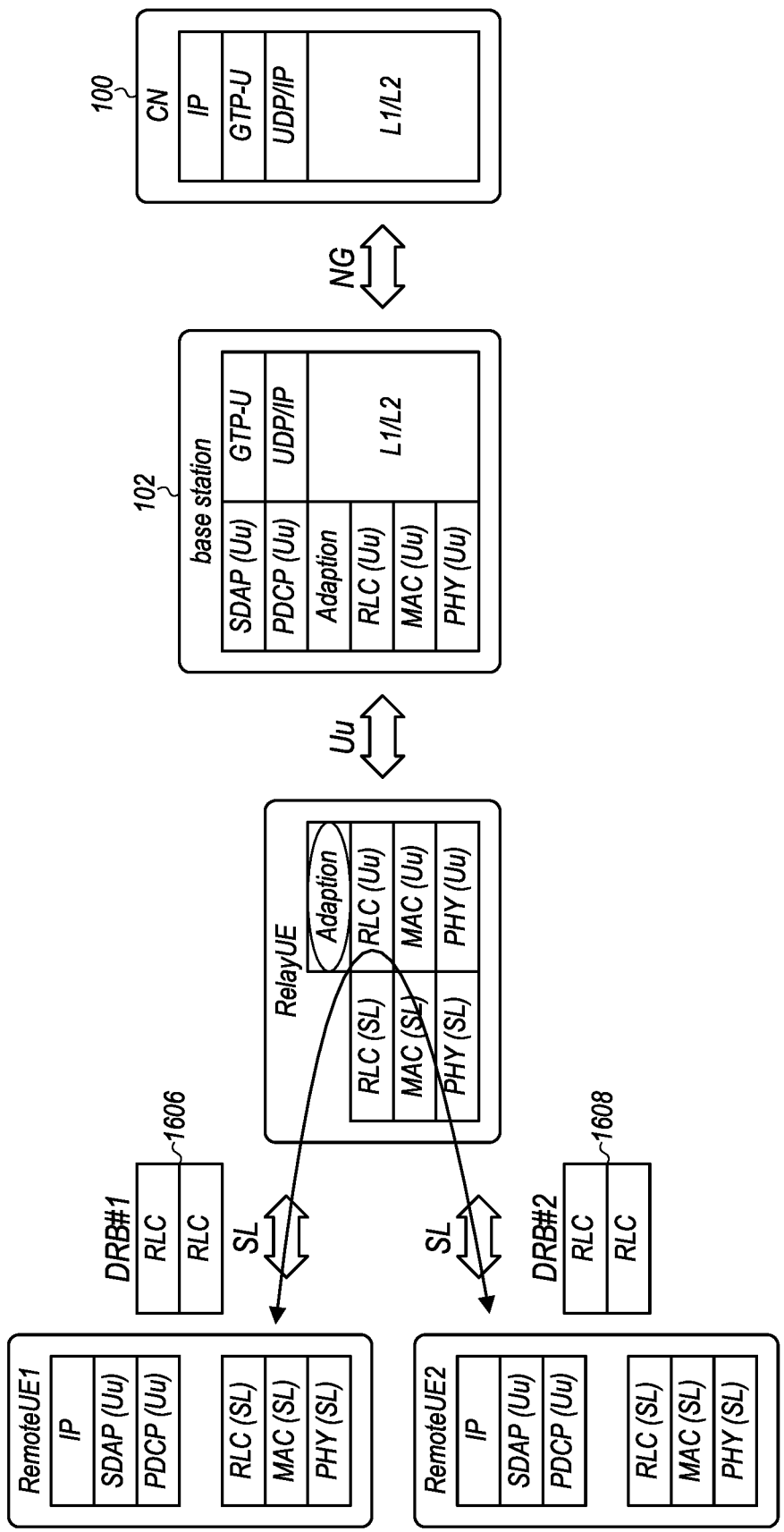
FIGS. 16-17 illustrate aspects of a local forward mode, according to some embodiments.

FIG. 16 illustrates a local forward mode, according to some embodiments. In the local forward mode, a relay UE (e.g., a UE 106) may relay data between two remote UEs (e.g., two accessory devices 107) and may not forward the data to a network (e.g., or base station 102). It will be appreciated that the relay UE and/or either or both of the remote UEs may still communicate with the base station for various purposes. For example, the base station may provide bearer configuration information configuring a local forward mode DRB between the remote UEs and the relay UE. Similarly, bearer configuration information may be relayed by the relay UE to/from the remote UEs, e.g., using one or more SRB. Note that either or both of the relay UE and/or remote UEs may separately exchange data with the base station/network using a direct connection, according to some embodiments.

The lower layer peer entities for each remote UE may be in the relay UE, while upper layer peer entities may be in the other remote UE. For example, for a remote UE, the SDAP layer and PDCP layer peer entities may be in the other remote UE. The peer entity for a remote UE's RLC layer, MAC layer and L1 (PHY) layer may be in the relay UE. As shown, one bearer (DRB #1) may correspond to transmissions (1606) between remote UE 1 and the relay UE. A second bearer (DRB #2) may correspond to transmissions (1608) between remote UE 2 and the relay UE. Thus, a packet transmitted from one UE to the other may use both bearers, e.g., sequentially. In some embodiments, a single DRB may be used for transmissions in both directions.

Figure 17:
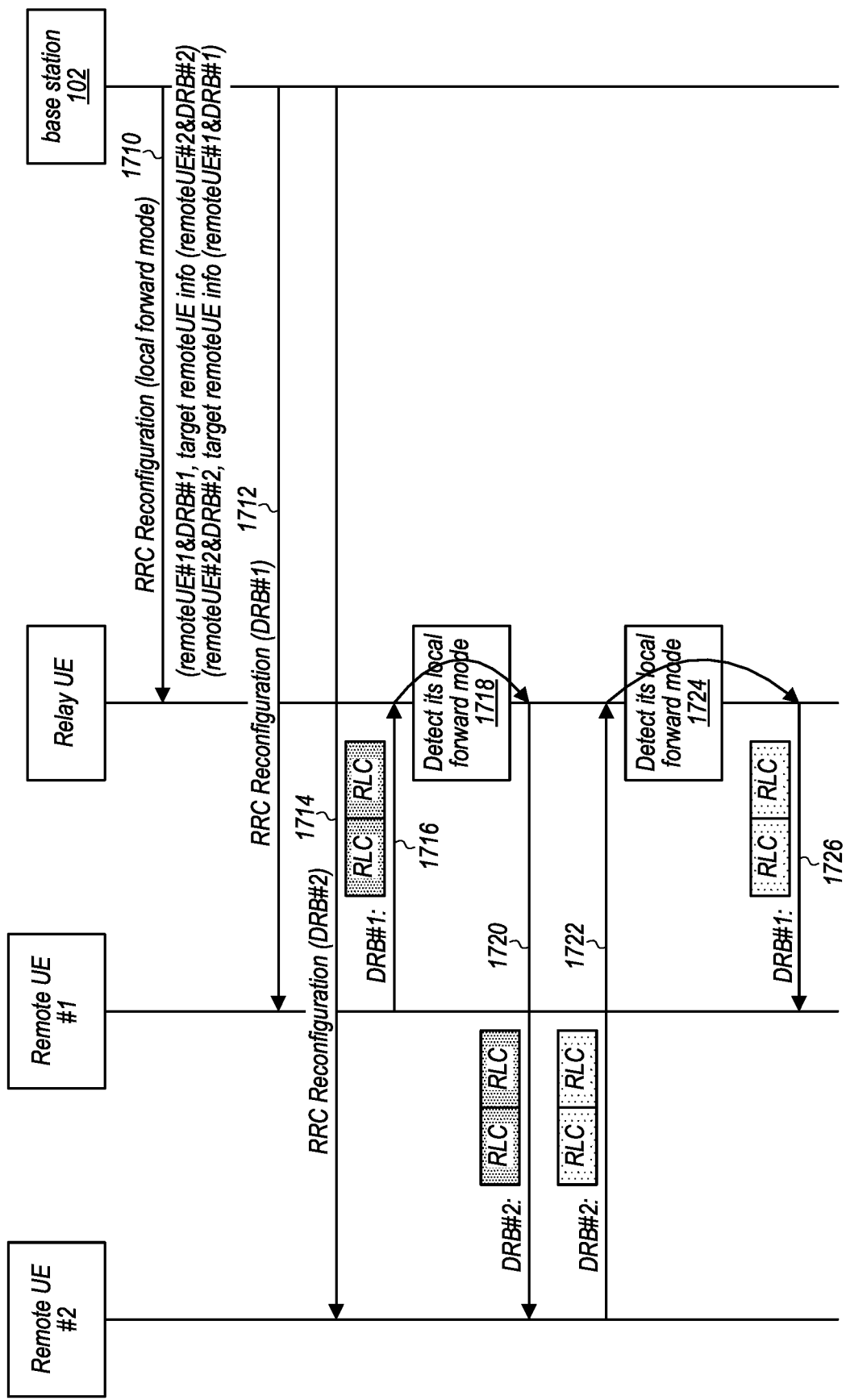

FIG. 17 is a communication flow diagram illustrating operation of the local forward DRB of FIG. 16, according to some embodiments. The base station may provide the relay UE with configuration (e.g., control plane) information relevant to the local forward mode (1710). For example, the network may provide the relay UE with bearer configuration information (e.g., in 504) that configures the relay UE about the DRB(s) used in local forward mode. For example, the bearer configuration information may identify the source and target peer remote UE-IDs for the mapped bearers, e.g., remote DRBs between the relay UE and respective remote DRBs. The network may configure a mapped relay DRB in Uu link, according to some embodiments.

The base station may further configure the remote UEs to use the respective DRBs, e.g., remote UE #1 may be configured to transmit data to remote UE #2 using DRB #1 (in 1712) and remote UE #2 may be configured to transmit data to remote UE #1 using DRB #2 (in 1714). The bearer configuration information may be provided by RRC message (e.g., RRC reconfiguration) or other higher layer signaling. It will be appreciated that the illustrated sequence of 1710-1714 is exemplary. The bearer configuration information to the UEs may be provided in any order or concurrently.

In 1716, remote UE #1 may transmit data (e.g., RLC SDUs) using DRB #1. The relay UE may receive the data at a lower layer entity, e.g., a PHY entity associated with SL functionality. An intermediate layer (e.g., adaptation layer) may determine (e.g., based on a bearer ID, LCH ID, or other indication that the data is mapped to DRB #1) that the data is associated with DRB #1 for local forward to remote UE 2 (1718). In response, the intermediate layer may not provide the data to any upper layer of the relay UE, and may cause the lower layers to transmit the data on DRB #1 to remote UE #2 (1720).

Similarly, in 1722, remote UE #2 may transmit data (e.g., RLC SDUs) using DRB #1. The relay UE may receive the data at a lower layer entity, e.g., a PHY entity associated with SL functionality. An intermediate layer (e.g., adaptation layer) may determine (e.g., based on a bearer ID, LCH ID, or other indication that the data is mapped to DRB #2) that the data is associated with DRB #2 for local forward to remote UE #1 (1724). In response, the intermediate layer may not provide the data to any upper layer of the relay UE, and may cause the lower layers to transmit the data on DRB #2 to remote UE #1 (1726).

Thus, the relay UE's (e.g., user plane) operation for the remote UE's bearer in local forward mode may be described as follows. When the relay UE receives the data from a source UE (e.g., remote UE #1) via relay link, the relay UE may determine that the bearer is in local forward mode. The relay UE may forward the data of the bearer to the corresponding target remote UE (e.g., remote UE #2). Similar operations may apply in the reverse direction.

It will be appreciated that transmissions in different directions between the remote UEs may occur in any sequence and/or concurrently. In some embodiments, more than two remote UEs may be connected via a relay UE. For example, multiple remote UEs may transmit to each other using unicast, multicast, groupcast, and/or broadcast messaging techniques.

In some embodiments, FIFO and/or prioritization based ordering schemes may be applied to any of the above described modes individually or in combination. For example, a relay UE may be configured to prioritize local forward transmissions from one UE over other forwarding (e.g., according to local path mode and/or normal forward mode). Further, the relay UE may be configured to use FIFO ordering within each priority group (e.g., among a group of local forward transmissions FIFO may be applied and similarly among a group of local path mode and/or normal forward mode transmissions, FIFO may be applied, when no local forward transmissions are in the buffer to be transmitted).

In some embodiments, a relay UE may maintain any number of transmission buffers associated with pending transmissions to the base station and/or to various remote UEs. FIFO and/or prioritization systems may be applied to schedule transmission from packets from any of the buffers or any combination of buffers.

In some embodiments, the cellular base station may perform resource allocation (e.g., providing grants) for transmissions between a relay UE and one or more remote UEs, e.g., using sidelink cellular communications.

Yet another exemplary embodiment may include a method, comprising: by a wireless device: performing any or all parts of the preceding examples.

Another exemplary embodiment may include a wireless device, comprising: an antenna; a radio coupled to the antenna; and a processing element operably coupled to the radio, wherein the device is configured to implement any or all parts of the preceding examples.

Still another exemplary embodiment may include an apparatus, comprising: a processing element configured to cause a wireless device to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
a processor configured to:
establish a first connection of relay user equipment device (UE) with a cellular base station;
establish a second connection with a remote UE;
receive, from the cellular base station, first bearer configuration information for the remote UE;
receive, from the cellular base station, second bearer configuration information comprising configuration of a bearer connecting the relay UE and the remote UE, wherein the second bearer configuration information sets an upper layer of the relay UE to a local path in which data is exchanged between the remote UE and the relay UE without being exchanged with a cellular network;
determine an identifier of the remote UE (remote UE-ID); and
exchange data between the remote UE and the cellular base station using the remote UE-ID, said exchanging data comprising one or more of:
a) receiving a first packet from the remote UE, appending the remote UE-ID to the first packet, and transmitting the first packet with the remote UE-ID to the cellular base station; or
b) receiving a second packet from the cellular base station, determining that the remote UE-ID is appended to the second packet, and transmitting the second packet to the remote UE based on determining that the remote UE-ID is appended to the second packet.

2. The apparatus of claim 1, wherein the processor is further configured to:
establish a third connection with a second remote UE;
receive, from the cellular base station, second bearer configuration information for the second remote UE;
determine a second remote UE-ID associated with the second remote UE; and
exchange data between the second remote UE and the cellular base station using the second remote UE-ID.

3. The apparatus of claim 2, wherein the processor is further configured to perform scheduling of packets exchanged between the remote UE or the second remote UE and the cellular base station according to a prioritization system.

4. The apparatus of claim 3, wherein the first bearer configuration information or the second bearer configuration information indicates relative priorities of the remote UE and the second remote UE.

5. The apparatus of claim 1, wherein said appending the remote UE-ID to the first packet comprises adding the remote UE-ID to an adaptation layer header of the first packet.

6. The apparatus of claim 1, wherein the remote UE-ID comprises a cell radio network temporary identifier (C-RNTI).

7. The apparatus of claim 1, wherein said exchanging data comprises using a cellular data radio bearer to communicate with the remote UE.

8. A method, comprising:
establish a first connection of relay user equipment device (UE) with a cellular base station;
establish a second connection with a remote UE;
receive, from the cellular base station, first bearer configuration information for the remote UE;
receive, from the cellular base station, second bearer configuration information comprising configuration of a bearer connecting the relay UE and the remote UE, wherein the second bearer configuration information sets an upper layer of the relay UE to a local path in which data is exchanged between the remote UE and the relay UE without being exchanged with a cellular network;
determine an identifier of the remote UE (remote UE-ID); and
exchange data between the remote UE and the cellular base station using the remote UE-ID, said exchanging data comprising one or more of:
a) receiving a first packet from the remote UE, appending the remote UE-ID to the first packet, and transmitting the first packet with the remote UE-ID to the cellular base station; or
b) receiving a second packet from the cellular base station, determining that the remote UE-ID is appended to the second packet, and transmitting the second packet to the remote UE based on determining that the remote UE-ID is appended to the second packet.

9. The method of claim 8, further comprising:
establish a third connection with a second remote UE;
receive, from the cellular base station, second bearer configuration information for the second remote UE;
determine a second remote UE-ID associated with the second remote UE; and
exchange data between the second remote UE and the cellular base station using the second remote UE-ID.

10. The method of claim 9, further comprising:
perform scheduling of packets exchanged between the remote UE or the second remote UE and the cellular base station according to a prioritization system.

11. The method of claim 10, wherein the first bearer configuration information or the second bearer configuration information indicates relative priorities of the remote UE and the second remote UE.

12. The method of claim 8, wherein said appending the remote UE-ID to the first packet comprises adding the remote UE-ID to an adaptation layer header of the first packet.

13. The method of claim 8, wherein the remote UE-ID comprises a cell radio network temporary identifier (C-RNTI).

14. The method of claim 8, wherein said exchanging data comprises using a cellular data radio bearer to communicate with the remote UE.

15. A method, comprising:
establishing a second connection with a relay user equipment device (UE);
receiving second bearer configuration information comprising configuration of a bearer connecting the relay UE and a remote UE, wherein the second bearer configuration information sets an upper layer of the relay UE to a local path in which data is exchanged between the remote UE and the relay UE without being exchanged with a cellular network;
determining an identifier of the remote UE (remote UE-ID); and
exchanging data between the remote UE and a cellular base station using the remote UE-ID.

16. The method of claim 15, wherein said exchanging data comprises using a cellular data radio bearer to communicate with the relay UE.

17. The method of claim 15, wherein said exchanging data is according to transmission scheduling from the relay UE.

18. The method of claim 15, wherein said exchanging data is according to a prioritization system.

19. The method of claim 15, wherein the remote UE-ID comprises a cell radio network temporary identifier (C-RNTI).

* * * * *